(12) United States Patent
Tian et al.

(10) Patent No.: US 11,249,586 B2
(45) Date of Patent: Feb. 15, 2022

(54) VOLTAGE-SUPPLY CIRCUIT, METHOD, AND TOUCH-CONTROL DISPLAY APPARATUS

(71) Applicants: Chongqing BOE Optoelectronics Technology Co., Ltd., Chongqing (CN); BOE TECHNOLOGY GROUP CO., LTD., Beijing (CN)

(72) Inventors: Zhenguo Tian, Beijing (CN); Shuang Hu, Beijing (CN); Shuai Chen, Beijing (CN); Xuebo Liang, Beijing (CN); Hong Chen, Beijing (CN); Xiuzhu Tang, Beijing (CN); Chuan Li, Beijing (CN); Yanan Zhao, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 505 days.

(21) Appl. No.: 16/344,333

(22) PCT Filed: Oct. 31, 2018

(86) PCT No.: PCT/CN2018/113014
§ 371 (c)(1),
(2) Date: Apr. 23, 2019

(87) PCT Pub. No.: WO2019/200888
PCT Pub. Date: Oct. 24, 2019

(65) Prior Publication Data
US 2021/0373732 A1 Dec. 2, 2021

(30) Foreign Application Priority Data
Apr. 19, 2018 (CN) .......................... 201810353871.X

(51) Int. Cl.
*G06F 3/041* (2006.01)

(52) U.S. Cl.
CPC ........ *G06F 3/04164* (2019.05); *G06F 3/0412* (2013.01); *G06F 3/04166* (2019.05)

(58) Field of Classification Search
None
See application file for complete search history.

(56) References Cited

U.S. PATENT DOCUMENTS

| | | | |
|---|---|---|---|
| 2014/0062990 A1* | 3/2014 | Zhang | G09G 3/3655 345/212 |
| 2014/0132580 A1* | 5/2014 | Hu | G09G 3/3688 345/209 |
| 2018/0082650 A1* | 3/2018 | Li | G09G 3/3614 |

* cited by examiner

*Primary Examiner* — Krishna P Neupane
(74) *Attorney, Agent, or Firm* — Intellectual Valley Law, P.C.

(57) ABSTRACT

The present application discloses a voltage-supply circuit including a voltage-supply sub-circuit coupled to a plurality of common-electrode blocks respectively via a plurality of signal lines in a display panel and configured to provide an initializing common-electrode voltage to each common-electrode block via a respective one signal line during an initialization period of a display time. The voltage-supply circuit further includes a voltage-feedback sub-circuit configured to collect a feedback voltage from the respective one signal line during the initialization period. Additionally, the voltage-supply circuit includes a voltage-comparison sub-circuit configured to compare the feedback voltage and a standard common-electrode voltage and to cause a generation of a trigger signal when a difference between the feedback voltage and the standard common-electrode voltage changes polarity. The trigger signal drives the voltage-supply sub-circuit in a normal output period to supply the standard common-electrode voltage via the respective one signal line to one corresponding common-electrode block.

20 Claims, 6 Drawing Sheets

US 11,249,586 B2

VOLTAGE-SUPPLY CIRCUIT, METHOD, AND TOUCH-CONTROL DISPLAY APPARATUS

CROSS-REFERENCE TO RELATED APPLICATION

This application is a national stage application under 35 U.S.C. § 371 of International Application No. PCT/CN2018/113014 filed Oct. 31, 2018, which claims priority to Chinese Patent Application No. 201810353871.X, filed Apr. 19, 2018, the contents of which are incorporated by reference in the entirety.

TECHNICAL FIELD

The present disclosure relates to display technology, more particularly, to a voltage-supply circuit, a voltage-supply method, and a touch-control display apparatus having the same.

BACKGROUND

Based on related touch-control display technology, a way to improve report rate of touch control is to insert touch-control scan voltage signals within one or more segments of one frame of display time. This is so-called LHB touch-control scan mode. According to a related technology, each common-electrode block in a display panel is reused as a touch-control electrode block. The common-electrode block needs to be applied with a common-electrode voltage during any non-touch-control periods for display purpose. When the display panel enters the display mode from the touch-control mode, the touch-control scan voltage signal on the common-electrode block needs to be converted to a common-electrode voltage signal. But during a transition period from the touch-control period to the display time the voltage level on the common-electrode block does not drop quickly from the touch-control scan voltage to a standard common-electrode voltage due to a RC-delay effect. This RC-delay will affect the displays of several rows of subpixels right after the end of the touch-control period, generating horizontal touch line effect at fixed positions in the display panel under the LHB touch-control scan mode.

SUMMARY

In an aspect, the present disclosure provides a voltage-supply circuit associated with a driver integrated circuit (IC) for providing voltages for a plurality of common-electrode blocks in a display panel. The voltage-supply circuit includes a voltage-supply sub-circuit coupled to the plurality of common-electrode blocks respectively via a plurality of signal lines and configured to at least provide an initializing common-electrode voltage to each common-electrode block via a respective one signal line during an initialization period of a display time. Additionally, the voltage-supply circuit includes a voltage-feedback sub-circuit configured to collect a feedback voltage based on the initializing common-electrode voltage from the respective one signal line during the initialization period. Furthermore, the voltage-supply circuit includes a voltage-comparison sub-circuit configured to compare the feedback voltage and a standard common-electrode voltage and to cause a generation of a trigger signal in response to a polarity change of a difference between the feedback voltage and the standard common-electrode voltage. The voltage-supply sub-circuit is triggered by the trigger signal to enter a normal output period to supply the standard common-electrode voltage via the respective one signal line to one of the common-electrode blocks.

Optionally, the voltage feedback sub-circuit is configured to collect the feedback voltage from a far end of the respective one signal line relative to the driver IC during the initialization period.

Optionally, each of the plurality of common-electrode blocks is configured to be a touch-control electrode block. The voltage-supply sub-circuit is further configured to supply a touch-control scan voltage via the respective one signal line to corresponding one touch-control block during a touch-control period. The initializing common-electrode voltage is set to be smaller than the standard common-electrode voltage when the touch-control scan voltage is greater than the standard common-electrode voltage.

Optionally, each of the plurality of common-electrode blocks is configured to be a touch-control electrode block. The voltage-supply sub-circuit is further configured to supply a touch-control scan voltage via the respective one signal line to corresponding one touch-control block during a touch-control period. The initializing common-electrode voltage is set to be greater than the standard common-electrode voltage when the touch-control scan voltage is smaller than the standard common-electrode voltage.

Optionally, the voltage-feedback sub-circuit includes a feedback switch, a feedback-control line, and a feedback-voltage line per signal line. The feedback switch includes a control terminal coupled to the feedback-control line, a first terminal coupled to the voltage-comparison sub-circuit via the feedback-voltage line, and a second terminal coupled to a far end of the respective one signal line. The feedback-control line is coupled to the driver IC. The feedback-voltage line is coupled to the voltage-comparison sub-circuit. The feedback switch is controlled by a first control signal via the feedback-control line to be turned ON during the initialization period to connect the voltage-comparison sub-circuit to the far end of the respective one signal line to collect the feedback voltage, and to be turned OFF during a normal output period following the initialization period and in a touch-control period before the initialization period to disconnect the voltage-comparison sub-circuit from the far end of the respective one signal line.

Optionally, the feedback switch includes a feedback transistor. A gate electrode of the feedback transistor is coupled to the feedback-control line. A first electrode of the feedback transistor is coupled to the voltage-comparison sub-circuit via the feedback-voltage line. A second electrode of the feedback transistor is coupled to the far end of the respective one signal line.

Optionally, the voltage-supply sub-circuit includes a power supply including a first power-supply voltage terminal for providing the initializing common-electrode voltage and a second power-supply voltage terminal for providing the standard common-electrode voltage.

Optionally, the voltage-supply sub-circuit further includes a first voltage selector, the first voltage selector having a first input terminal coupled to the first power-supply voltage terminal, a second input terminal coupled to the second power-supply voltage terminal, a first control terminal coupled to the feedback-control line, and a first output terminal configured to be selectively connected with the first input terminal or the second input terminal under control of the first control signal via the feedback-control line.

Optionally, the voltage-supply sub-circuit further includes a second voltage selector coupled to the first voltage selector in series. The second voltage selector includes a third input terminal coupled to the second power-supply voltage terminal to receive a touch-control scan voltage, a fourth input terminal coupled to the first output terminal of the first voltage selector, a second control terminal coupled to a selection line from a controller, and a second output terminal coupled to the signal line and being selectively connected to the first input terminal during the display time or to the second input terminal during the touch-control period under control of a second control signal via the selection line from the controller.

Optionally, the voltage-comparison sub-circuit includes an emitter follower and a voltage comparator. The emitter follower has an input terminal coupled to the second power-supply voltage terminal and an output terminal coupled to a noninverting input terminal of the voltage comparator. An inverting input terminal of the voltage comparator is coupled to the feedback-voltage line and an output terminal of the voltage comparator is coupled to the controller.

Optionally, the voltage comparator is configured during the initialization period to output a voltage changed from a low level to a high level to cause a generation of the trigger signal to end the initialization period and enter the normal output period when the voltage comparator determines that the feedback voltage is smaller than the standard common-electrode voltage as the initializing common-electrode voltage is set to be smaller than the standard common-electrode voltage when the touch-control scan voltage is greater than the standard common-electrode voltage.

Optionally, the voltage comparator is configured during the initialization period to output a voltage changed from a high level to a low level to cause a generation of the trigger signal to end the initialization period and enter the normal output period when the voltage comparator determines that the feedback voltage is greater than the standard common-electrode voltage as the initializing common-electrode voltage is set to be greater than the standard common-electrode voltage when the touch-control scan voltage is smaller than the standard common-electrode voltage.

In another aspect, the present disclosure provides a method for supplying voltages to a touch-control display panel. The method includes supplying an initializing common-electrode voltage from a voltage-supply circuit associated with a driver integrated circuit (IC) of the touch-control display panel to one of a plurality of common-electrode blocks via a respective one signal line in an initialization period of a display time. The method further includes collecting a feedback voltage associated with the initializing common-electrode voltage from the respective one signal line during the initialization period. Additionally, the method includes comparing the feedback voltage with a standard common-electrode voltage supplied by the voltage-supply circuit. Furthermore, the method includes generating a trigger signal to enter a normal output period following the initialization period of the display time if a difference between the feedback voltage and the standard common-electrode voltage changes polarity. Moreover, the method includes supplying the standard common-electrode voltage via the respective one signal line to the one of the common-electrode blocks.

Optionally, the respective one signal line includes a near end connected to the voltage-supply circuit in the driver IC and a far end connected to a feedback switch. The step of collecting the feedback voltage includes turning on the feedback switch under control of a first feedback-control signal to collect the feedback voltage from the far end of the signal line during the initialization period.

Optionally, each common-electrode block is configured to be a touch-control electrode block. The method further includes supplying a touch-control scan voltage via the signal line to the touch-control electrode block during a touch-control period before or after the display time. Furthermore, the method includes setting the initializing common-electrode voltage to be smaller than the standard common-electrode voltage if the touch-control scan voltage is greater than the standard common-electrode voltage.

Optionally, each common-electrode block is configured to be a touch-control electrode block. The method further includes supplying a touch-control scan voltage via the signal line to the touch-control electrode block during a touch-control period before or after the display time. Furthermore, the method includes setting the initializing common-electrode voltage to be greater than the standard common-electrode voltage if the touch-control scan voltage is smaller than the standard common-electrode voltage.

Optionally, the step of collecting the feedback voltage includes inputting the feedback voltage via a feedback-voltage line to an inverting input terminal of a voltage comparator with a standard common-electrode voltage being inputted to a noninverting input terminal of the voltage comparator.

Optionally, the step of generating the trigger signal includes determining by the voltage comparator that the difference between the feedback voltage and the standard common-electrode voltage changes polarity. The step of generating the trigger signal also includes causing the driver IC to adjust a first control signal to turn the feedback switch OFF to disconnect the feedback-voltage line from the far end of the signal line and adjust a second control signal to output a standard common-electrode voltage via the respective one signal line to a corresponding one of the plurality of common-electrode blocks in the touch-control display panel.

In yet another aspect, the present disclosure provides a touch-control display apparatus. The touch-control display apparatus includes a plurality of common-electrode blocks arranged in an array. Each common-electrode block is configured to a touch-control electrode block within a display cycle including at least one touch-control period being inserted to two segments of a display time. A voltage-supply circuit described herein is connected via respective one signal line to corresponding one of the common-electrode blocks.

Optionally, the display cycle of the touch-control display apparatus includes at least two segments of display time and at least two touch-control periods. Each segment of display time and each touch-control period are set alternately in time. Each segment of display time following a touch-control period includes sequentially an initialization period and a normal output period. The voltage-supply circuit is configured, through the initialization period, to change an operation of supplying a touch-control scan voltage to a corresponding one touch-control electrode block during the touch-control period to another operation of supplying a standard common-electrode voltage to the corresponding one of the plurality of common-electrode blocks in the normal output period. The initialization period is made substantially short in time.

BRIEF DESCRIPTION OF THE FIGURES

The following drawings are merely examples for illustrative purposes according to various disclosed embodiments and are not intended to limit the scope of the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
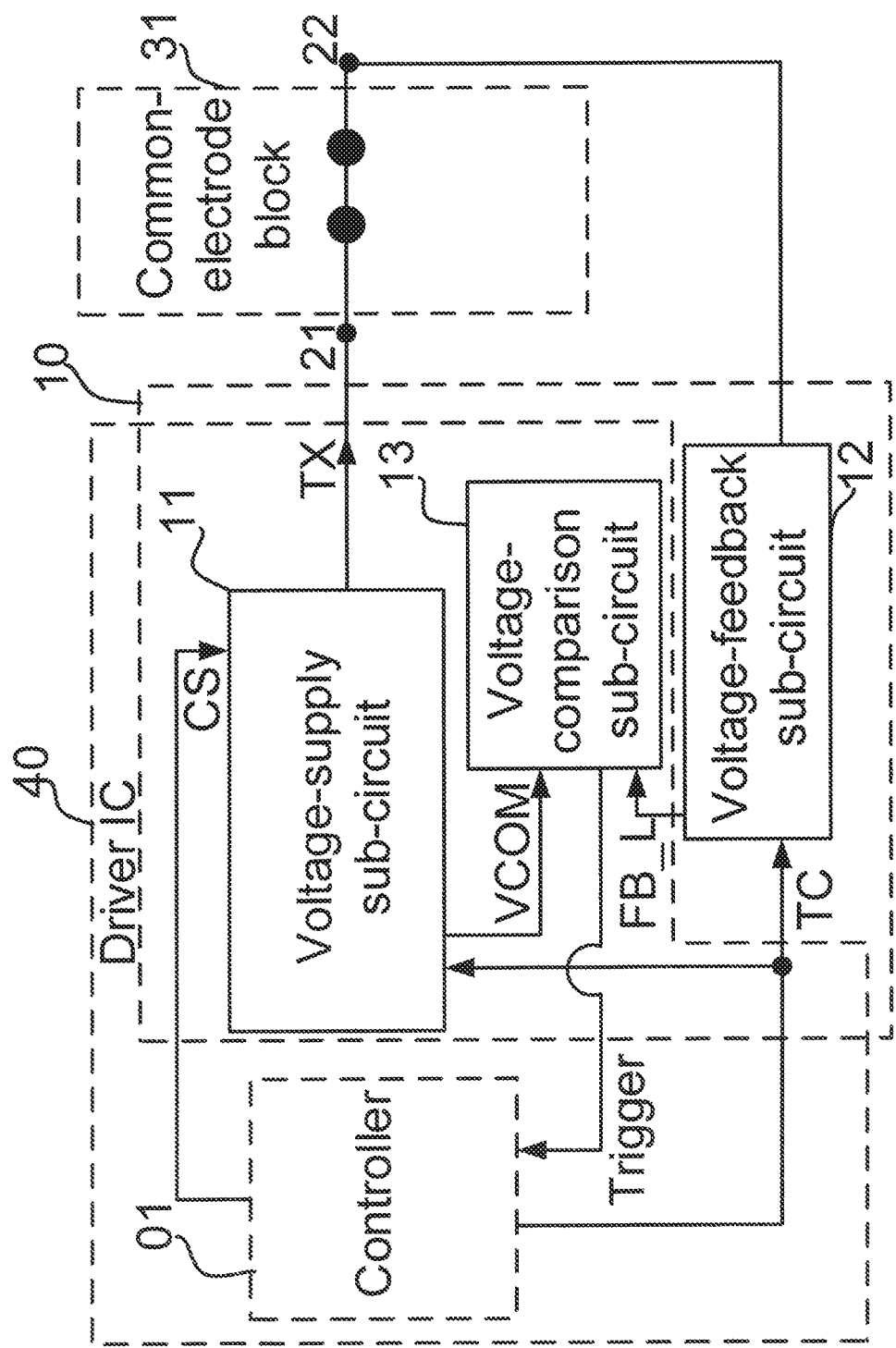
FIG. 1 is a block diagram of a voltage-supply circuit according to some embodiments of the present disclosure.

Accordingly, the present disclosure provides, inter alia, a voltage-supply circuit for supplying both common-electrode voltage and touch-control scan voltage to a common-electrode block to perform touch-control enabled image display, a method of driving the voltage-supply circuit, and a display apparatus having the same that substantially obviate one or more of the problems due to limitations and disadvantages of the related art. In one aspect, the present disclosure provides a voltage-supply circuit for providing voltages to respective common-electrode blocks in a touch-control display panel. FIG. 1 is a block diagram of a voltage-supply circuit according to some embodiments of the present disclosure.

Referring to FIG. 1, the voltage-supply circuit 10 is configured to supply voltage to a common-electrode block 31 via a signal line TX. The common-electrode block 31 is used as a common-electrode for a plurality of pixel circuits of the touch-control display panel during a regular display period and is also reused as a touch-control-electrode block when a touch control operation is performed to the touch-control display panel in a touch-control period. In an embodiment, the voltage-supply circuit 10 is associated with a driver integrated circuit (driver IC) 40 of the touch-control display panel. The driver IC typically includes a controller 01 for generating all control signals and multiple clock signals for driving the display panel. In the embodiment, the voltage-supply circuit 10 includes a voltage-supply sub-circuit 11, a voltage-feedback sub-circuit 12, a voltage-comparison sub-circuit 13, and multiple signal lines including at least the signal line TX, a first control line TC which is also a feedback-control line, a second control line CS which is also a selection line, a feedback-voltage line FB_L. In particular, the signal line TX is connected to the voltage-supply sub-circuit 11 to receive electrical signals and pass to the common-electrode block 31. The first control line TC and the second control line CS here are also coupled to the controller 01.

In a display time, the voltage-supply sub-circuit 11 is configured to provide a standard common-electrode voltage VCOM via the signal TX to the common-electrode block 31 of the touch-control display panel. In a display time right after a touch-control period, it is provided with an initialization period in the embodiment, during which the voltage-supply sub-circuit 11 is also configured to provide an initializing common-electrode voltage VCOML. While in the touch-control period, the voltage-supply sub-circuit 11 is configured to provide a touch-control scan voltage TS to the same common-electrode block 31 which is also served as a touch-control-electrode block.

In the embodiment, the voltage-feedback sub-circuit 12 is configured to collect a feedback voltage VCOM_FB from the signal line TX during the initialization period as the initializing common-electrode voltage VCOML is introduced there. Depended on the touch-control scan voltage TS used in the touch-control period, the initializing common-electrode voltage VCOML may be set to be smaller or greater than the standard common-electrode voltage VCOM. The voltage-comparison sub-circuit 13 is coupled to the voltage-supply sub-circuit 11 to receive the standard common-electrode voltage VCOM and is also coupled to the voltage-feedback sub-circuit 12 to receive the feedback voltage VCOM_FB which is changing in value through the initialization period due to the capacitance effect. The voltage-comparison sub-circuit 13 is configured to compare the feedback voltage VCOM_FB with the standard common-electrode voltage VCOM. In a specific embodiment, when the voltage-comparison sub-circuit 13 determines that a difference between the feedback voltage VCOM_FB and the standard common-electrode voltage VCOM changes polarity (from negative to positive or vice versa) it will cause a generation of a trigger signal sent to the controller 01 for effectively ending the initialization period and entering the normal output period so that the standard common-electrode voltage VCOM can be supplied via the signal line TX to the electrode block 31. One advantage of the present disclosure of the voltage-supply circuit 10 lies in a substantial reduction of the initialization period which is basically a time period for the voltage level at the common-electrode block to quickly reach the standard common-electrode voltage VCOM from a touch-control scan voltage once the display panel is entering the display mode. The shorter this time period, the better improvement is achieved on eliminating the horizontal touch-control line effect in the displayed image.

Referring to FIG. 1, the signal line TX includes a near end 21 and a far end 22. The near end 21 refers to the end of the signal line that is closer to the driver IC 40 which is usually disposed in a side of the display panel. The far end 22 refers to the end of the signal line that is relatively far from the driver IC 40 or a down-stream location. A voltage transmitted to the signal line from the voltage-supply circuit 10 in the driver IC 40 always reaches the near end 21 first and the far end 22 later. Usually, change of the voltage on the far end of the signal line is slower than the near end. In the embodiment, the voltage-feedback sub-circuit 12 is preferred to collect the feedback voltage VCOM_FB outputted from the far end 22 of the signal line TX, although the collection of the feedback voltage in principle can be collected from anywhere of the signal line TX.

In an embodiment, the voltage-feedback sub-circuit 12 is enabled to collect the feedback voltage VCOM_FB only in the initialization period that is controlled by a control signal from the controller 01 via the first control line TC. Specifically, when the touch-control period ends and the display time starts, a turn-on signal is provided from the controller 01 to enable the voltage-feedback sub-circuit to start collecting the feedback voltage VCOM_FB and sending the feedback voltage to the voltage-comparison sub-circuit 13. When the initialization period ends triggered by the trigger signal, a turn-off signal is provided from the controller 01 to stop collecting the feedback signal by disconnecting the voltage-comparison sub-circuit 13 from the signal line TX.

Figure 2:
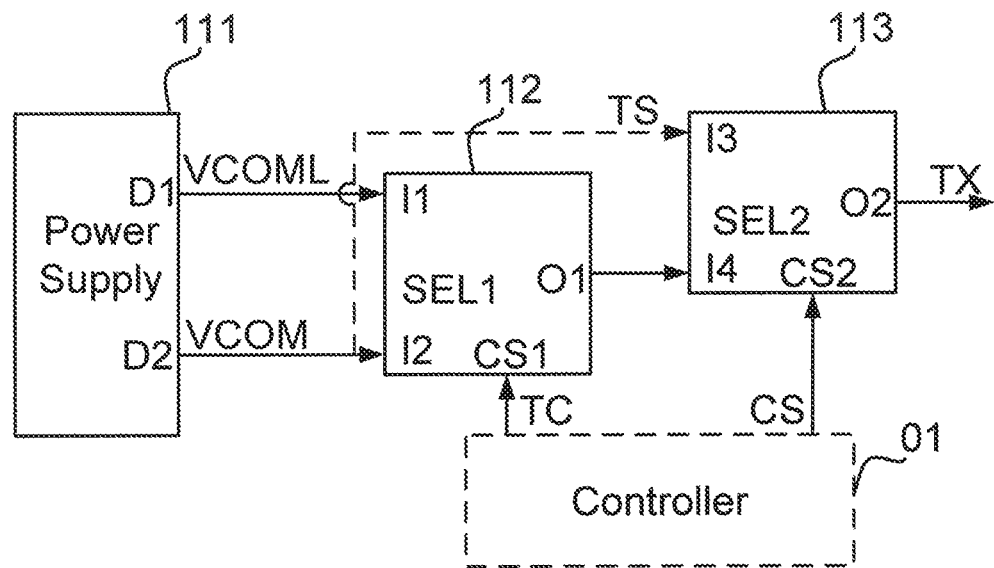
FIG. 2 is a block diagram of a voltage-supply sub-circuit of the voltage-supply circuit according to an embodiment of the present disclosure.

Both the initializing common-electrode voltage VCOML and the standard common-electrode voltage VCOM are provided by the voltage-supply sub-circuit 11 during the initialization period. FIG. 2 is a block diagram of a voltage-supply sub-circuit of the voltage-supply circuit according to an embodiment of the present disclosure. Referring to FIG. 2, the voltage-supply sub-circuit 11 includes a power supply 111, a first voltage selector 112, and a second voltage selector 113. The power supply 111 is configured to supply the initializing common-electrode voltage VCOML to a first power-supply voltage terminal D1 and separately supply the standard common-electrode voltage VCOM to a second power-supply voltage terminal D2.

The first voltage selector 112 includes a first input terminal I1 coupled to the first power-supply voltage terminal D1 to receive the initializing common-electrode voltage VCOML. Also, the first voltage selector 112 includes a second input terminal I2 coupled to the second power-supply voltage terminal D2 to receive the standard common-electrode voltage VCOM. Additionally, the first voltage selector 112 includes a first control terminal CS1 coupled to the first control line TC configured to transfer a control signal TC from the controller 01. The first voltage selector 112 is configured to be controlled by the control signal TC at the first control terminal CS1 to connect the first output terminal O1 either to the first input terminal I1 or to the second input terminal I2. Optionally, when the control signal TC, which is generated by the controller 01, is a high voltage level, the first output terminal O1 is connected to the first input terminal I1. When the control signal TC is a low voltage level, the first output terminal O1 is connected to the second input terminal I2.

Similarly, the second voltage selector 113 includes a third input terminal I3 configured to receive a touch-control scan voltage TS, a fourth input terminal I4 coupled to the first output terminal O1 of the first voltage selector 112. The second voltage selector 113 also includes a second control terminal CS2 coupled to the second control line CS configured to transfer another control signal CS from the controller 01. Furthermore, the second voltage selector 113 includes a second output terminal O2 coupled to the signal line TX. The second voltage selector 113 is configured to be controlled by the control signal CS at the second control terminal CS2 to connect the second output terminal O2 either to the third input terminal I3 or to the fourth input terminal I4. Optionally, when the control signal CS is a high voltage level, which is generated by the controller 01, the second output terminal O2 is connected to the third input terminal I3 and when the control signal CS is a low voltage level, the second output terminal O2 is connected to the fourth input terminal I4.

In an embodiment, the voltage-supply sub-circuit 11 is configured to provide both the initializing common-electrode voltage VCOML and the standard common-electrode voltage VCOM during the initialization period of a display time. When the initialization period starts, the control signal TC is provided with a high voltage level which drives the first voltage selector 112 to connect the first output terminal O1 to the first input terminal I1. Therefore, the first output terminal O1 outputs the initializing common-electrode voltage VCOML. At the same time, the control signal CS is provided with a low voltage level so that the second output terminal O2 is connected to the fourth input terminal I4 which connects to the first output terminal O1. Thus, the initializing common-electrode voltage VCOML is outputted to the signal line TX. Alternatively, in a touch-control period, the control signal CS is given a high voltage level so that the second output terminal O2 is connected to the third input terminal I3 to output the touch-control scan voltage provided thereof to the signal line TX. Optionally, during the touch-control period, the touch-control scan voltage TS is also sent via the second power-supply voltage terminal D2 of the power supply 111. In the touch-control period, the common-electrode block 31 is also used as a touch-control-electrode block and the touch-control scan voltage TS is thus used for scanning the display panel to support touch control function.

In a specific embodiment, the initializing common-electrode voltage VCOML is selectively set to be either smaller than or greater than the standard common-electrode voltage VCOM depending on whether the touch-control scan voltage TS is greater than or smaller than the standard common-electrode voltage. If the touch-control scan voltage is greater than the standard common-electrode voltage, the initializing common-electrode voltage is set to be smaller than the standard common-electrode voltage so that the voltage level on the common-electrode block can be quickly pulled down from the touch-control scan voltage to the standard common-electrode voltage within the time period of transition from the touch-control period to the normal output period of the display time. If the touch-control scan voltage is smaller than the standard common-electrode voltage, the initializing common-electrode voltage is set to be greater than the standard common-electrode voltage so that the voltage level on the common-electrode block can be quickly pulled up from the touch-control scan voltage to the standard common-electrode voltage within the time period of transition from the touch-control period to the normal output period of the display time. In fact, the voltage-feedback sub-circuit 12 is used to monitor the change of the voltage level on the common-electrode block via the signal line TX. In other words, the feedback voltage VCOM_FB collected from the signal line TX is substantially reflected the voltage change thereof.

For example, when the touch-control scan voltage is greater than the standard common-electrode voltage, VCOML is set to be −1V substantially smaller than VCOM of −4V. Optionally, the difference between the VCOM and VCOML can be set to be greater than a preset value. For example, the preset value is no smaller than 2V and no greater than 4V without specific limitation on this as it can be adjusted based in applications. For mobile terminal product, VCOM may be set to be no smaller than −2V but no greater than −1V, then VCOML is set to be no smaller than −5V but no greater than −4V. For notebook product, VCOM may be set to be no smaller than 2.5V and no greater than 3.5V, then VCOML is set to be no smaller than 0.5V but no greater than 1.5V.

Figure 3:
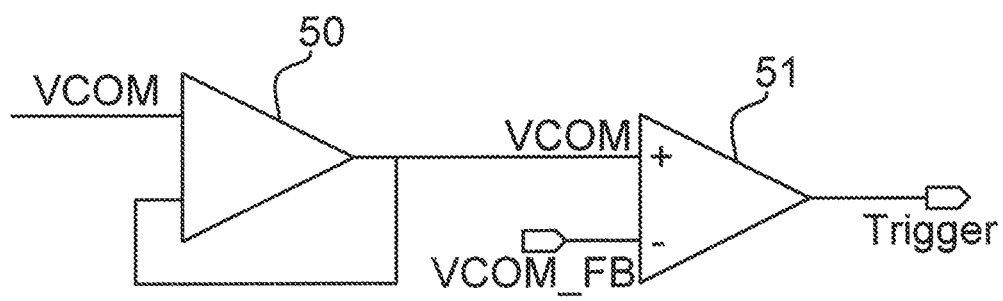
FIG. 3 is a block diagram of a voltage-comparison sub-circuit of the voltage-supply circuit according to an embodiment of the present disclosure.

FIG. 3 shows a block diagram of a voltage-comparison sub-circuit of the voltage-supply circuit according to an embodiment of the present disclosure. Referring to FIG. 3, the voltage-comparison sub-circuit 13 includes an emitter follower 50 and a voltage comparator 51 coupled in series.

The emitter follower 50 includes an input terminal coupled to the second power-supply voltage terminal D1 to receive the standard common-electrode voltage VCOM. The emitter follower 50 is optionally a common collector amplifying circuit, which has high input resistance, high efficiency of transmitting signal source signal, low output resistance, and strong load capacity. Optionally, the voltage amplification factor of the emitter follower 50 is less than 1 and close to 1 so that the output voltage has the same phase as the input voltage, with follow-up characteristics, which is widely used as an intermediate isolation stage to provide stable output of the same voltage VCOM to its output terminal. The voltage comparator 51 has a noninverting input terminal coupled in series to the output terminal of the emitter follower 50 to receive the standard common-electrode voltage VCOM and an inverting input terminal coupled to the feedback-voltage line FB_L to receive the feedback voltage VCOM_FB collected in real time. The voltage comparator 51 is performing a comparison function to output a low voltage level when the voltage at the inverting input terminal is greater than that at the noninverting input terminal or output a high voltage level when the voltage levels at the two input terminals are reversed. When the feedback voltage VCOM_FB is greater than the standard common-electrode voltage VCOM, the voltage comparator 51 outputs a low voltage level. As the time proceeds in the initialization period the voltage level on the signal line TX is approaching the level of VCOML (which is selected to be outputted to the signal line TX and is smaller than VCOM), the feedback voltage VCOM-FB drops quickly. When the feedback voltage VCOM_FB is smaller than VCOM, i.e., the voltage comparator 51 sees a change of polarity of the difference between the VCOM and VCOM_FB and outputs a high voltage level. The change from the low voltage level to the high voltage level causes a generation of a trigger signal being sent to the controller 01, which indicates the end of the initialization period and start of the normal output period.

Figure 4:
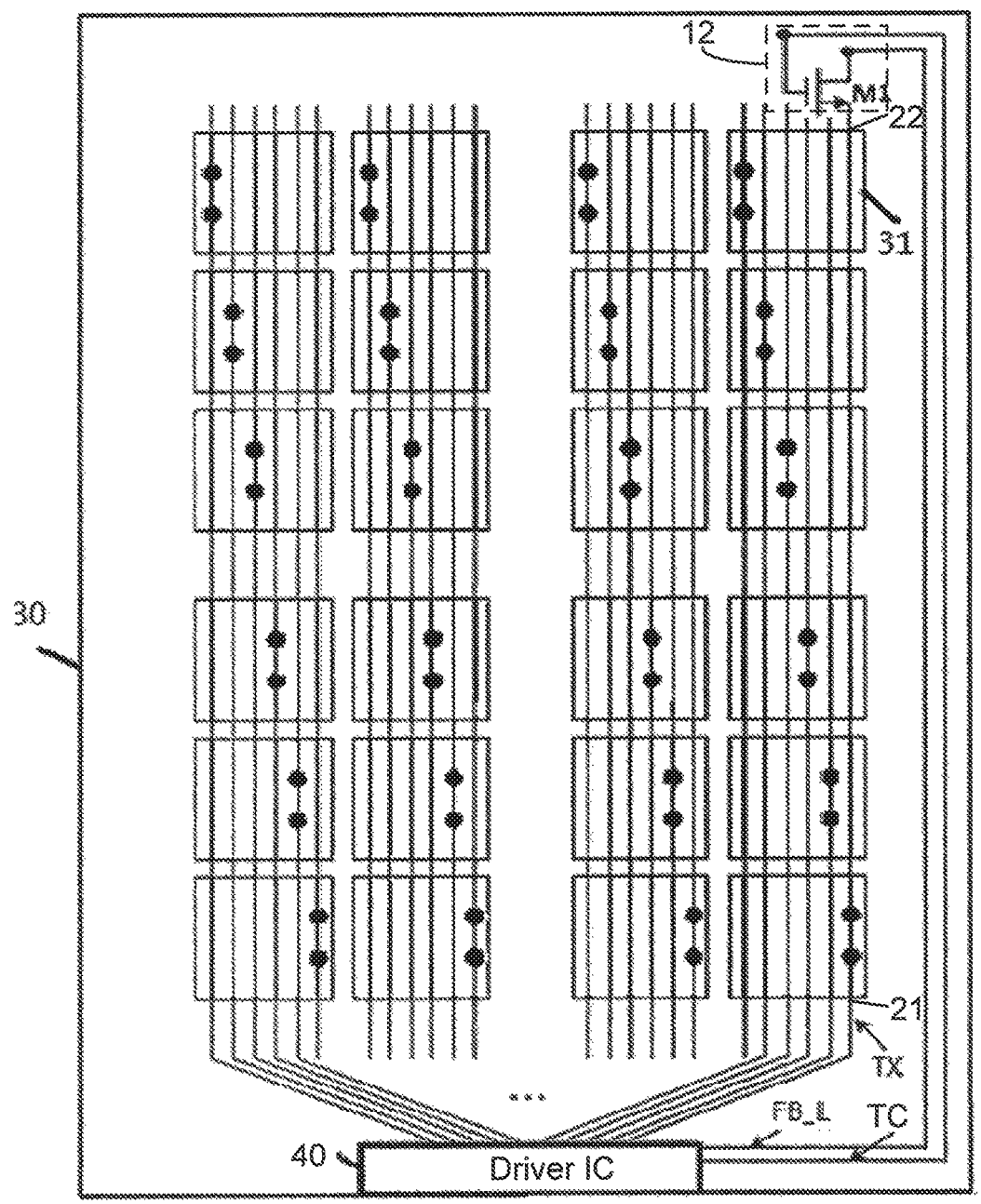
FIG. 4 is a schematic diagram of a voltage-supply circuit for supplying voltages to via a plurality of signals to respectively a plurality of common-electrode blocks according to the embodiment of the present disclosure.

FIG. 4 is a schematic diagram of a voltage-supply circuit for supplying voltages to via a plurality of signals to respectively a plurality of common-electrode blocks according to the embodiment of the present disclosure. Referring to FIG. 4, a display panel 30 is disposed with an array of common-electrode blocks 31. Each common-electrode block 31 is connected via a respective one signal line TX to the driver IC 40. In particular, each signal line TX includes a near end 21 connected to the driver IC 40 and a far end 22 connected first to the voltage-feedback sub-circuit 12 then to a feedback-voltage line FB_L. The far end 22 is relatively farther from the voltage-supply sub-circuit 11 located in the driver IC 40 than the near end 21. In particular, the near end 21 of the signal line TX is connected to the voltage-supply sub-circuit 11 (see FIG. 1) of the voltage-supply circuit 10 (not shown in FIG. 3) inside the driver IC 40. The voltage-feedback sub-circuit 12 includes a feedback switch M1, a feedback-control line which is also coupled to the first control line TC, and the feedback-voltage line FB_L. The feedback switch M1 is a transistor having a control terminal (i.e., a gate electrode) coupled to the feedback-control line TC, a first terminal (i.e., a first electrode) coupled to the feedback-voltage line FB_L, and a second terminal (i.e., a second electrode) coupled to the far end 22 of the respective one signal line TX. The feedback-voltage line FB_L is coupled to the voltage-comparison sub-circuit 13 as seen in FIG. 1. Optionally, the transistor M1 is a n-type transistor.

In an embodiment, referring to FIG. 1 and FIG. 4, part of the voltage-supply circuit 10 belongs to the driver IC 40 except the voltage-feedback sub-circuit 12 which is configured to be switch transistor positioned at the far end 22 of the signal line TX to couple with the plurality of common-electrode blocks. The feedback-control line TC is connected to the controller in the driver IC 40.

When the display time starts after finishing the touch-control period, i.e., in the initialization period, the controller 01 of the driver IC 40 outputs a control signal at high voltage level to the first control line TC to turn on the transistor M1 so that the far end 22 of the signal line TX is connected to the feedback-voltage line FB_L, allowing that a voltage level at the far end 22 of the signal line TX can be collected as a feedback voltage VCOM_FB and be sent through the feedback-voltage line FB_L to the voltage-comparison sub-circuit 13 located inside the driver IC 40. At the same time as the initialization period starts, referring to FIG. 2, when the control signal TC is set to the high voltage level applied to the first control terminal CS1, the first voltage selector 112 is set to connect the first output terminal O1 to the first input terminal I1 so that the O1 outputs the initializing common-electrode voltage VCOML (which is supplied from the first power-supply voltage terminal D1 of the power supply 111) to the fourth input terminal I4 of the second voltage selector 113. Substantially at the same time, he driver IC 40 also provides a low voltage control signal to the second control line CS which is applied to the second control terminal CS2, the second voltage selector 113 is set to connect the second output terminal O2 to the fourth input terminal I4 to receive the initializing common-electrode voltage VCOML and supply it to the respective signal line TX.

Figure 5:
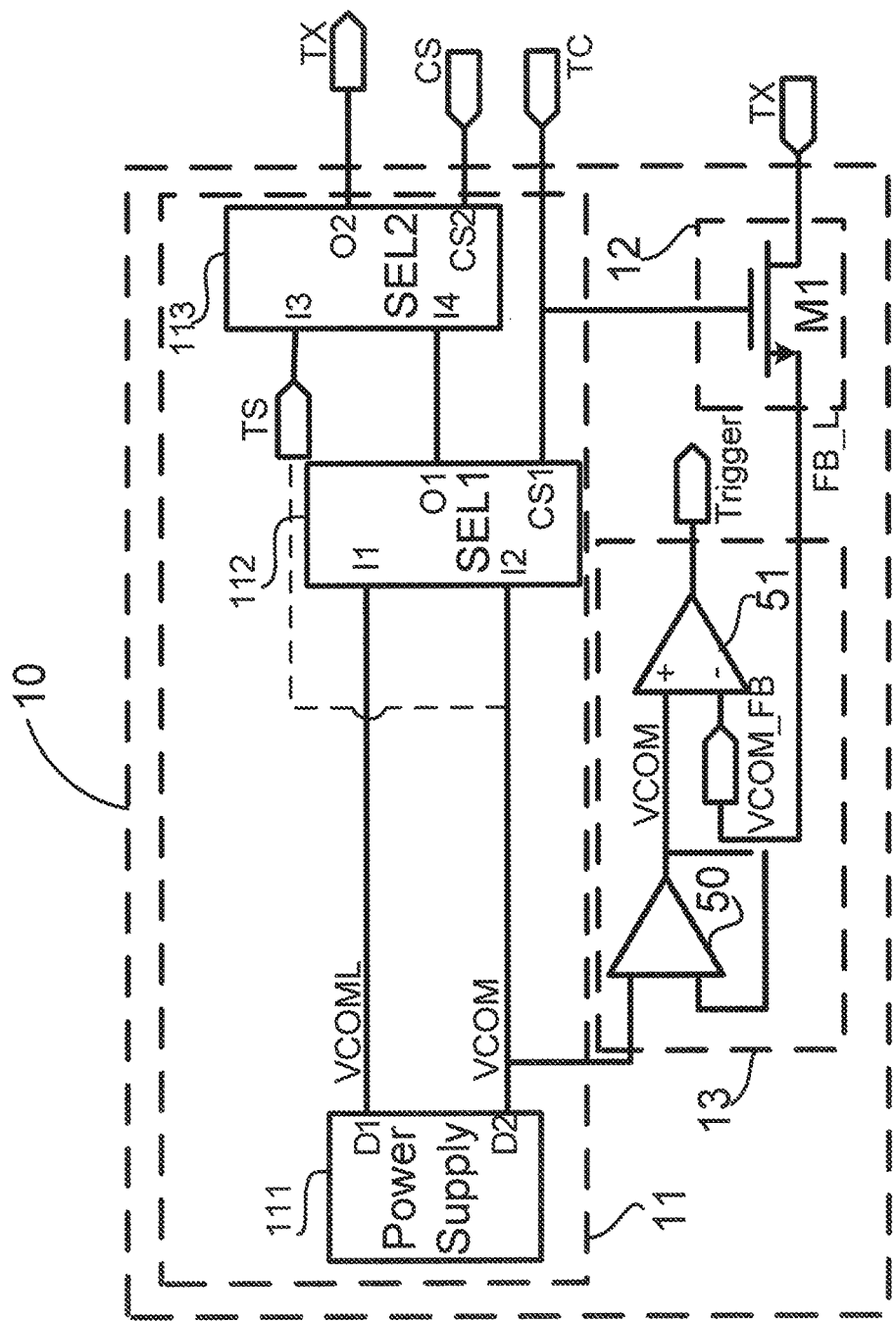
FIG. 5 is a block diagram of a voltage-supply circuit according to an embodiment of the present disclosure.

FIG. 5 is a block diagram of a voltage-supply circuit according to an embodiment of the present disclosure. In a specific embodiment, the voltage-supply circuit 10 includes a voltage-supply sub-circuit 11, a voltage-feedback sub-circuit 12, a voltage-comparison sub-circuit 13, and multiple signal lines. At least one signal line TX outputs the voltage to a common-electrode block (not shown) in one-to-one relationship.

The voltage-supply sub-circuit includes a power supply 111, a first voltage selector SEL1 (112), and a second voltage selector SEL2 (113). The power supply 111 is configured to supply an initializing common-electrode voltage VCOML through a first power-supply voltage terminal D1 and supply a standard common-electrode voltage VCOM through a second power-supply voltage terminal D2. The first voltage selector SEL1 has a first input terminal I1 coupled to the first power-supply voltage terminal D1 and a second input terminal I2 coupled to the second power-supply voltage terminal D2. The first voltage selector SEL1 has a control terminal CS1 coupled to the feedback-control line TC and an output terminal O1 connected to a fourth input terminal I4 of the second voltage selector SEL2. The feedback-control line TC is also connected to a control terminal of the voltage-feedback sub-circuit 12, which receives the control signal from a controller 01 (see FIG. 2).

The first voltage selector SEL1 is controlled by a control signal TC applied to the control terminal CS1 to selectively connect the output terminal O1 with either the first input terminal I1 or the second input terminal I2. Effectively, when the control signal TC is a high voltage level, the first voltage selector SEL1 allows the first power-supply voltage terminal D1 to connect with the fourth input terminal I4 of the second voltage selector SEL2.

The second voltage selector SEL2 has a third input terminal I3 configured to receive a touch-control scan voltage TS. The second voltage selector SEL2 also has a control terminal CS2 coupled to a selection line CS and an output terminal O2 coupled to the signal line TX. The selection line CS is also coupled to the controller 01, as seen in FIG. 2. The controller 01 is disposed in a driver IC, as seen in FIG. 1, which is not shown in FIG. 5. The second voltage selector SEL2 is controlled by the control signal CS to selectively connect the output terminal O2 to either the third input terminal I3 or the fourth input terminal I4, thereby outputting either the touch-control scan voltage TS or the voltage received by the fourth input terminal I4 to the signal line TX. In touch-control period, the control signal CS is set to a high voltage to allow the output terminal O2 to connect with the third input terminal I3 so that the touch-control scan voltage TS is outputted to the signal line TX and applied to the touch-control-electrode block. In a normal display time, the control signal CS is supposed to be a low voltage to allow the output terminal O2 of the second voltage selector SEL2 to connect with the fourth input terminal I4. At the same time, the control signal TC is supposed to be also a low voltage to allow the output terminal O1 of the first voltage selector SEL1 to connect with the second input terminal I2. Therefore, the combination of the first voltage selector SEL1 and the second voltage selector SEL2 allows the standard common-electrode voltage to be outputted to the signal line TX and applied to the corresponding common-electrode block which is the same one as the touch-control-electrode block.

Referring to FIG. 5, the voltage-comparison sub-circuit includes an emitter follower 50 and a voltage comparator 51. The emitter follower 50 has its input terminal to receive the standard common-electrode voltage VCOM from the second power-supply voltage terminal D2 of the power supply 111. The inverting input terminal of the voltage comparator 51 is received the feedback voltage VCOM_FB. The noninverting input terminal of the voltage comparator 51 is connected to an output of the emitter follower 50 which is essentially a stabilized standard common-electrode voltage VCOM received at its input terminal. The output terminal of the voltage comparator 51 is configured to connect with the controller 01, as seen in FIG. 2.

Further in FIG. 5, the voltage-feedback sub-circuit 12 is shown as a switch transistor M1. The gate electrode of the switch transistor M1 is coupled to the feedback-control line TC. The first electrode or the drain electrode of M1 is coupled to the feedback-voltage line FB_L. The second electrode or the source electrode of M1 is coupled to the voltage comparator 51. Under the same control signal TC, the switch transistor M1 is turned on when the initialization period starts (or the touch-control period ends) to allow a feedback voltage VCOM_FB collected from the signal line TX to be inputted into the inverting input terminal of the voltage comparator 51.

Figure 6:
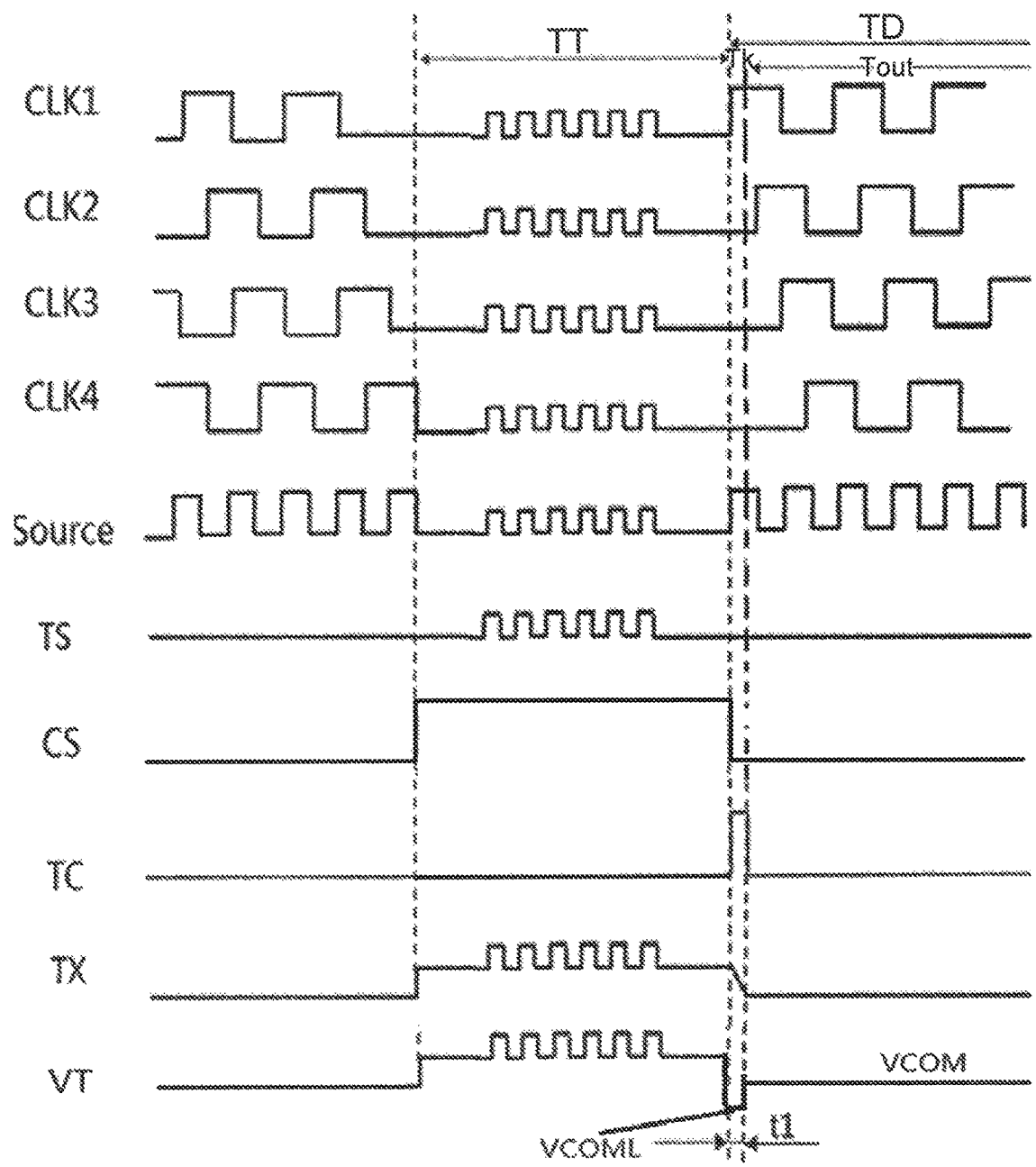
FIG. 6 is a timing waveform diagram of signals for operating the voltage-supply circuit to supply voltages in an initialization period Tk followed by a normal output period Tout of a display time TD and a touch-control period TT inserted in between two segmented display times according to an embodiment of the present disclosure.

FIG. 6 is a timing waveform diagram of signals for operating the voltage-supply circuit to supply voltages in an initialization period Tk followed by a normal output period Tout of a display time TD and a touch-control period TT inserted in between two segmented display times according to an embodiment of the present disclosure. Combining the FIG. 6 with the FIG. 5, the operation of the voltage-supply circuit for supplying alternate touch-control scan voltage or standard common-electrode voltage in separate time periods can be illustrated as following. Here, the touch-control scan voltage TS is assumed to be greater than the standard common-electrode voltage VCOM and the initializing common-electrode voltage VCOML is set to be smaller than the standard common-electrode voltage VCOM.

Referring to FIG. 6, the display time TD, which is set after a touch-control period TT, sequentially includes an initialization period Tk and a normal output period Tout. In the touch-control period TT, the control signal CS is set to a high voltage level, allowing the second voltage selector SEL2 to be controlled to output the touch-control scan voltage TS to the signal line TX. The touch-control scan voltage TS is then applied to the common-electrode block which is reused as a touch-control-electrode block at the time.

When entering the initialization period Tk, the control signal TC is set to a high voltage level, allowing the first voltage selector SEL1 to be controlled to output the initializing common-electrode voltage VCOML to the second voltage selector SEL2. The control signal CS is changed to a low voltage level after entering the initializing period Tk so that the second voltage selector SEL2 further output the initializing common-electrode voltage VCOML to the signal line TX and to cause the voltage level at the common-electrode block to drop quickly (as the VCOML is set to be substantially smaller than VCOM). The voltage-feedback sub-circuit 12 is used to capture a feedback voltage VCOM_FB that reflects the drop of voltage level at the signal line TX from the touch-control scan voltage TS towards the VCOML.

The voltage comparator 51 performs voltage comparison of the two voltages of VCOM and VCOM_FB. When VCOM_FB is greater than VCOM, the voltage comparator 51 outputs a low voltage level. When VCOM_FB is smaller than VCOM, the voltage comparator 51 outputs a high voltage level. Then a trigger signal is generated by a rising edge detected by the driver IC 40 (see FIG. 1) which will change the feedback-control signal TC to a low voltage level. As seen in FIG. 1, FIG. 2, and FIG. 4, the low voltage level of the control signal TC will turn off the feedback switch transistor M1 so that the voltage comparator 51 is disconnected from the signal line TX, thereby stopping the feedback voltage collection and ending the initialization period Tk. At the same time, the low voltage level of the control signal TC leads an entry of a normal output period Tout. In the normal output period Tout. The low voltage level of TC controls the first voltage selector SEL1 to connect the output terminal O1 to the second power-supply voltage terminal to pass the standard common-electrode voltage VCOM to the fourth input terminal I4 of the second voltage selector SEL2. The control signal CS still is at the low voltage level so that the second voltage selector SEL2 is controlled to connect the output terminal O2 to the fourth input terminal I4 so that the standard common-electrode voltage VCOM is outputted to the signal line TX and further to the corresponding common-electrode block.

In FIG. 6, the signal VT represents a voltage level supplied from the voltage-supply sub-circuit 11 to the signal line TX. In the touch-control period TT, the touch-control scan voltage TS is provided. Optionally, this is still supplied from the second power-supply voltage terminal D2. In the initialization period Tk, the initializing common-electrode voltage VCOML is supplied. In the normal output period Tout, the standard common-electrode voltage VCOM is provided. VCOML<VCOM<TS. The sustained time t1 of the initialization period Tk is made to be substantially short in time by setting VCOML smaller than VCOM. In an alternative embodiment, when touch-control scan voltage TS is smaller than the standard common-electrode voltage VCOM, the initializing common-electrode voltage VCOML is set to be greater than the standard common-electrode voltage VCOM.

During the initialization period Tk, the feedback voltage VCOM_FB in this case is increasing so that voltage comparator will be able to detect a trigger signal reflecting a falling edge of voltage level to indicate the end of the initialization period Tk and an entry of a normal output period Tout. Effectively, the voltage-supply circuit of the present disclosure reduces time duration for the voltage level on the common-electrode block being changed from TS to VCOM to substantially eliminate the horizontal touch line in the displayed image right after the end of touch-control period.

In FIG. 6, an example of four clock signals CLK1, CLK2, CLK3, and CLK4 being used in the touch-control display panel is adopted for a mere illustration purpose. In the touch-control period TT, since the touch-control-electrode block is a reused common-electrode block, all the clock signal lines CLK1~CLK4, the signal line TX, and display panel source line Source are configured to output the same touch-control scan voltage TS so that the effect of those signals on the signal lines near to the signal line TX to the touch-control scan voltage TS will be minimized.

In another aspect, the present disclosure provides a method for driving the voltage-supply circuit to supply voltages to a touch-control display panel. The touch-control display panel contains a plurality of common-electrode blocks respectively connected with a plurality of signal lines through which different voltages are supplied at different periods. The display time is optionally separated to several segments with one touch-control period being inserted between two segments. Each segment of display time is sequentially set with an initialization period followed by a normal output period. The method includes supplying an initializing common-electrode voltage from the voltage-supply circuit associated with a driver integrated circuit (IC) of the touch-control display panel to one of a plurality of common-electrode blocks via a respective one signal line in an initialization period of a (segment of) display time. The method further includes collecting a feedback voltage from the respective one signal line during the initialization period. Additionally, the method includes comparing the feedback voltage with a standard common-electrode voltage supplied by the voltage-supply circuit. Furthermore, the method includes generating a trigger signal to enter a normal output period following the initialization period of the display time if a difference between the feedback voltage and the standard common-electrode voltage changes polarity. Moreover, the method includes supplying the standard common-electrode voltage in the normal output period via the respective one signal line to the one of the common-electrode blocks.

In the method, each common-electrode block is configured to be reused as a touch-control electrode block. The method further includes supplying a touch-control scan voltage via the signal line to the touch-control electrode block during the touch-control period inserted between any two segments of display time. Additionally, the method includes setting the initializing common-electrode voltage to be smaller than the standard common-electrode voltage if the touch-control scan voltage is greater than the standard common-electrode voltage. Or the method includes setting the initializing common-electrode voltage to be greater than the standard common-electrode voltage if the touch-control scan voltage is smaller than the standard common-electrode voltage.

In yet another aspect, the present disclosure provides a touch-control display apparatus. The display apparatus includes a plurality of common-electrode blocks arranged in an array. Each common-electrode block is configured to a touch-control electrode block within a display cycle including at least one touch-control period being inserted to two segments of a display time. The display apparatus further includes a voltage-supply circuit described herein. The voltage-supply circuit is connected via respective one signal line to corresponding one of the common-electrode blocks.

Figure 7:
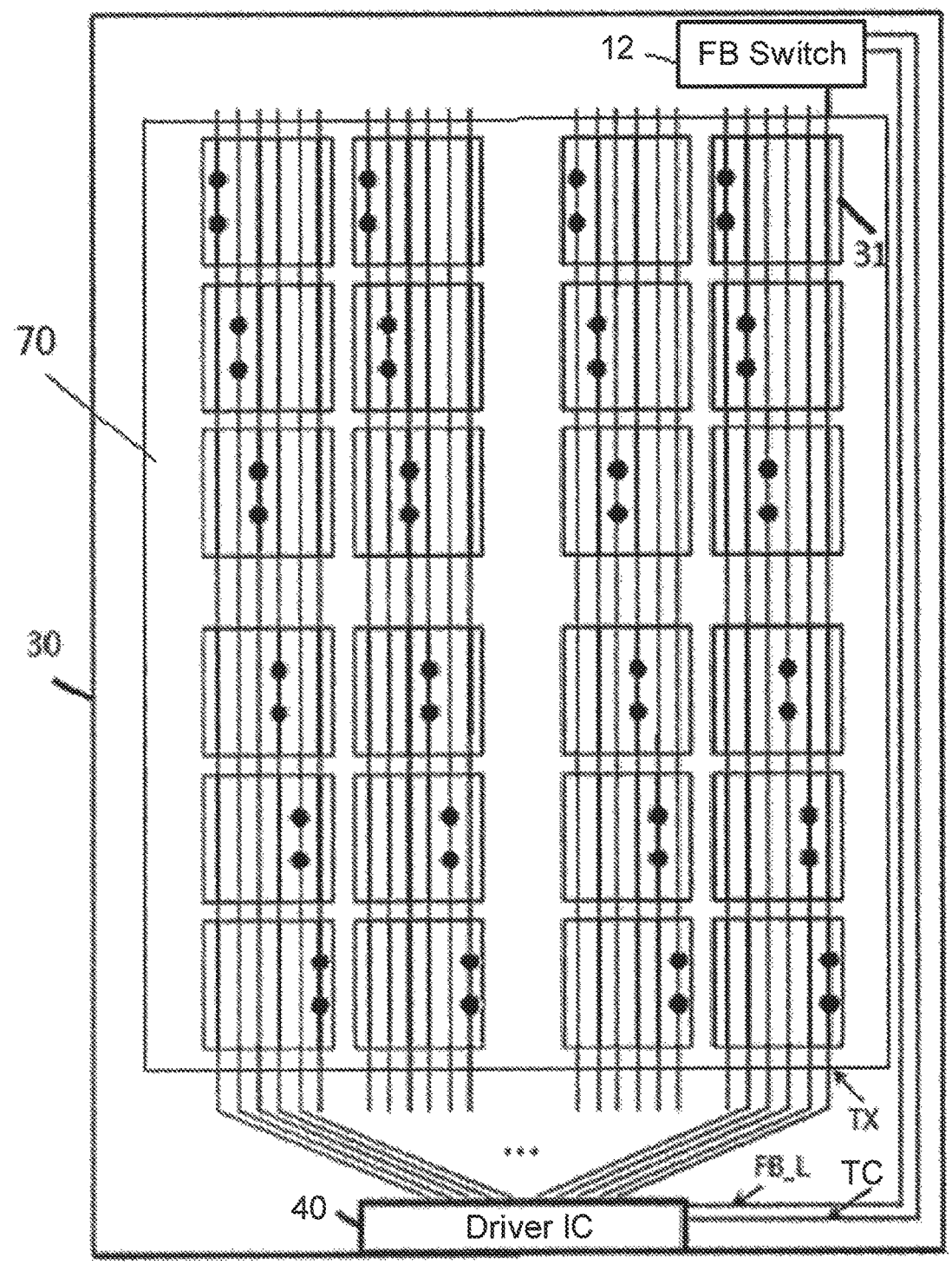
FIG. 7 is a structural diagram of a display apparatus according to an embodiment of the present disclosure.

FIG. 7 is a structural diagram of a display apparatus according to an embodiment of the present disclosure. Referring to FIG. 7, the touch-control display apparatus includes a display panel 30 and a driver integrated circuit (driver IC) 40. The display panel 30 is configured with a display area 70 outside of which is a non-display area. The driver IC 40 including a voltage-supply circuit is disposed in the non-display area. The display panel also includes an array of common-electrode blocks 31 and the voltage-supply circuit of the present disclosure (not shown but at least partially disposed in the driver IC 40). The voltage-supply circuit includes a voltage-feedback sub-circuit being disposed outside the driver IC 40 coupled to a far end of the signal line TX. Specifically, the voltage-feedback sub-circuit 12 is a feedback (FB) switch having a first electrode coupled to the far end of the signal line TX, a second electrode coupled to the feedback voltage line FB_L, and a gate electrode coupled to a control line TC linked back to a controller in the driver IC 40.

Each display cycle of the touch-control display apparatus includes at least two segments of display time and at least two touch-control periods. Each segment of display time and each touch-control period are set alternately in time. Each segment of display time that follows a touch-control period includes sequentially an initialization period followed by a normal output period. The voltage-supply circuit is configured, through the initialization period, to change an operation of supplying a touch-control scan voltage to a corresponding one touch-control electrode block during the touch-control period to another operation of supplying a standard common-electrode voltage to the corresponding one common-electrode block in the normal output period, wherein the initialization period is made substantially short in time.

The foregoing description of the embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A voltage-supply circuit associated with a driver integrated circuit (IC) for providing voltages for a plurality of common-electrode blocks in a display panel, the voltage-supply circuit comprising:
   a voltage-supply sub-circuit coupled to the plurality of common-electrode blocks respectively via a plurality of signal lines and configured to at least provide an initializing common-electrode voltage to each common-electrode block via a respective one signal line during an initialization period of a display time;
   a voltage-feedback sub-circuit configured to collect a feedback voltage based on the initializing common-electrode voltage from the respective one signal line during the initialization period;
   a voltage-comparison sub-circuit configured to compare the feedback voltage and a standard common-electrode voltage and to cause a generation of a trigger signal in response to a polarity change of a difference between the feedback voltage and the standard common-electrode voltage, wherein the voltage-supply sub-circuit is triggered by the trigger signal to enter a normal output period to supply the standard common-electrode voltage via the respective one signal line to one of the plurality of common-electrode blocks.

2. The voltage-supply circuit of claim 1, wherein the voltage feedback sub-circuit is configured to collect the feedback voltage from a far end of the respective one signal line relative to the driver IC during the initialization period.

3. The voltage-supply circuit of claim 1, wherein each of the plurality of common-electrode blocks is configured to be a touch-control electrode block; wherein the voltage-supply sub-circuit is further configured to supply a touch-control scan voltage via the respective one signal line to corresponding one touch-control block during a touch-control period; wherein the initializing common-electrode voltage is set to be smaller than the standard common-electrode voltage when the touch-control scan voltage is greater than the standard common-electrode voltage.

4. The voltage-supply circuit of claim 1, wherein each of the plurality of common-electrode blocks is configured to be a touch-control electrode block; wherein the voltage-supply sub-circuit is further configured to supply a touch-control scan voltage via the respective one signal line to corresponding one touch-control block during a touch-control period; wherein the initializing common-electrode voltage is set to be greater than the standard common-electrode voltage when the touch-control scan voltage is smaller than the standard common-electrode voltage.

5. The voltage-supply circuit of claim 4, wherein the voltage-feedback sub-circuit comprises,
   a feedback switch, a feedback-control line, and a feedback-voltage line per signal line;
   the feedback switch including a control terminal coupled to the feedback-control line, a first terminal coupled to the voltage-comparison sub-circuit via the feedback-voltage line, and a second terminal coupled to a far end of the respective one signal line;
   the feedback-control line being coupled to the driver IC;
   the feedback-voltage line being coupled to the voltage-comparison sub-circuit;
   wherein the feedback switch is controlled by a first control signal via the feedback-control line to be turned ON during the initialization period to connect the voltage-comparison sub-circuit to the far end of the respective one signal line to collect the feedback voltage, and to be turned OFF during a normal output period following the initialization period and in a touch-control period before the initialization period to disconnect the voltage-comparison sub-circuit from the far end of the respective one signal line.

6. The voltage-supply circuit of claim 5, wherein the feedback switch comprises a feedback transistor, wherein a gate electrode of the feedback transistor is coupled to the feedback-control line, a first electrode of the feedback transistor is coupled to the voltage-comparison sub-circuit via the feedback-voltage line, and a second electrode of the feedback transistor is coupled to the far end of the respective one signal line.

7. The voltage-supply circuit of claim 5, wherein the voltage-supply sub-circuit comprises a power supply including a first power-supply voltage terminal for providing the initializing common-electrode voltage and a second power-supply voltage terminal for providing the standard common-electrode voltage.

8. The voltage-supply circuit of claim 7, wherein the voltage-supply sub-circuit further comprises a first voltage selector, the first voltage selector having a first input terminal coupled to the first power-supply voltage terminal, a second input terminal coupled to the second power-supply voltage terminal, a first control terminal coupled to the feedback-control line, and a first output terminal configured to be selectively connected with the first input terminal or the second input terminal under control of the first control signal via the feedback-control line.

9. The voltage-supply circuit of claim 8, wherein the voltage-supply sub-circuit further comprises a second voltage selector coupled to the first voltage selector in series, and the second voltage selector comprises a third input terminal coupled to the second power-supply voltage terminal to receive a touch-control scan voltage, a fourth input terminal coupled to the first output terminal of the first voltage selector, a second control terminal coupled to a selection line from a controller, and a second output terminal coupled to the signal line and being selectively connected to the first input terminal during the display time or to the second input terminal during the touch-control period under control of a second control signal via the selection line from the controller.

10. The voltage-supply circuit of claim 9, wherein the voltage-comparison sub-circuit comprises an emitter follower and a voltage comparator; the emitter follower having an input terminal coupled to the second power-supply voltage terminal and an output terminal coupled to a noninverting input terminal of the voltage comparator, wherein an inverting input terminal of the voltage comparator is coupled to the feedback-voltage line, and an output terminal of the voltage comparator is coupled to the controller.

11. The voltage-supply circuit of claim 10, wherein the voltage comparator is configured during the initialization period to output a voltage changed from a low level to a high level to cause a generation of the trigger signal to end the initialization period and enter the normal output period when the voltage comparator determines that the feedback voltage is smaller than the standard common-electrode voltage as the initializing common-electrode voltage is set to be smaller than the standard common-electrode voltage when the touch-control scan voltage is greater than the standard common-electrode voltage.

12. The voltage-supply circuit of claim 10, wherein the voltage comparator is configured during the initialization period to output a voltage changed from a high level to a low level to cause a generation of the trigger signal to end the initialization period and enter the normal output period when the voltage comparator determines that the feedback voltage is greater than the standard common-electrode voltage as the initializing common-electrode voltage is set to be greater than the standard common-electrode voltage when the touch-control scan voltage is smaller than the standard common-electrode voltage.

13. A touch-control display apparatus comprising:
a plurality of common-electrode blocks arranged in an array, each common-electrode block being configured to a touch-control electrode block within a display cycle including at least one touch-control period being inserted to two segments of a display time;
a voltage-supply circuit of claim 1 connected via respective one signal line to corresponding one of the common-electrode blocks.

14. The touch-control display apparatus of claim 13, wherein the display cycle of the touch-control display apparatus includes at least two segments of display time and at least two touch-control periods, wherein each segment of display time and each touch-control period are set alternately in time, wherein each segment of display time following a touch-control period includes sequentially an initialization period and a normal output period, wherein the voltage-supply circuit is configured, through the initialization period, to change an operation of supplying a touch-control scan voltage to a corresponding one touch-control electrode block during the touch-control period to another operation of supplying a standard common-electrode voltage to the corresponding one of the plurality of common-electrode blocks in the normal output period, wherein the initialization period is made substantially short in time.

15. A method for supplying voltages to a touch-control display panel, the method comprising:
supplying an initializing common-electrode voltage from a voltage-supply circuit associated with a driver integrated circuit (IC) of the touch-control display panel to one of a plurality of common-electrode blocks via a respective one signal line in an initialization period of a display time;
collecting a feedback voltage associated with the initializing common-electrode voltage from the respective one signal line during the initialization period;
comparing the feedback voltage with a standard common-electrode voltage supplied by the voltage-supply circuit;
generating a trigger signal to enter a normal output period following the initialization period of the display time if a difference between the feedback voltage and the standard common-electrode voltage changes polarity;
supplying the standard common-electrode voltage via the respective one signal line to the one of the common-electrode blocks.

16. The method of claim 15, wherein the respective one signal line comprises a near end connected to the voltage-supply circuit in the driver IC and a far end connected to a feedback switch, wherein collecting the feedback voltage comprises turning on the feedback switch under control of a first feedback-control signal to collect the feedback voltage from the far end of the signal line during the initialization period.

17. The method of claim 16, wherein collecting the feedback voltage comprises inputting the feedback voltage via a feedback-voltage line to an inverting input terminal of a voltage comparator with a standard common-electrode voltage being inputted to a noninverting input terminal of the voltage comparator.

18. The method of claim 17, wherein generating the trigger signal comprises determining by the voltage comparator that the difference between the feedback voltage and the standard common-electrode voltage changes polarity; causing the driver IC to adjust a first control signal to turn the feedback switch OFF to disconnect the feedback-voltage line from the far end of the signal line and adjust a second control signal to output a standard common-electrode voltage via the respective one signal line to a corresponding one of the plurality of common-electrode blocks in the touch-control display panel.

19. The method of claim 15, wherein each common-electrode block is configured to be a touch-control electrode block, the method further comprising:
supplying a touch-control scan voltage via the signal line to the touch-control electrode block during a touch-control period before or after the display time;
setting the initializing common-electrode voltage to be smaller than the standard common-electrode voltage if the touch-control scan voltage is greater than the standard common-electrode voltage.

20. The method of claim 15, wherein each common-electrode block is configured to be a touch-control electrode block, the method further comprising:
supplying a touch-control scan voltage via the signal line to the touch-control electrode block during a touch-control period before or after the display time;
setting the initializing common-electrode voltage to be greater than the standard common-electrode voltage if the touch-control scan voltage is smaller than the standard common-electrode voltage.

* * * * *